Aug. 27, 1963 C. W. SKARSTROM 3,102,013
HEATLESS FRACTIONATION UTILIZING ZONES IN SERIES AND PARALLEL
Filed Aug. 2, 1960
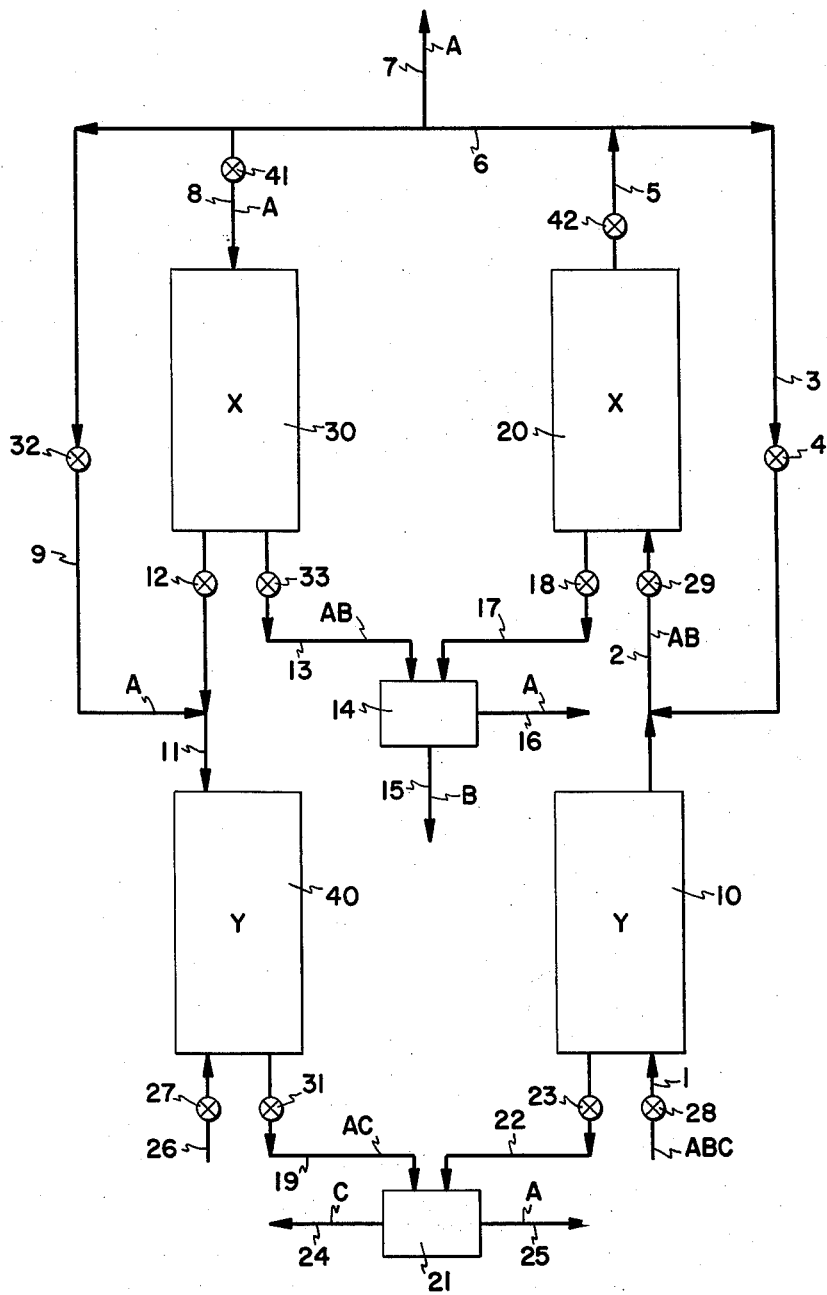
Charles W. Skarstrom Inventor
By W. O. Heilman
Patent Attorney

United States Patent Office 3,102,013
Patented Aug. 27, 1963

3,102,013
HEATLESS FRACTIONATION UTILIZING ZONES IN SERIES AND PARALLEL
Charles W. Skarstrom, Montvale, N.J., assignor to Esso Research and Engineering Company, a corporation of Delaware
Filed Aug. 2, 1960, Ser. No. 47,035
4 Claims. (Cl. 55—31)

The present invention is concerned with an improved method for fractionating gaseous mixtures. The invention comprises an extension of the invention of U.S. Patent 2,944,627, issued July 12, 1960, entitled "Method and Apparatus for Fractionating Gaseous Mixtures by Adsorption," inventor Charles W. Skarstrom. In accordance with the present invention a plurality of zones are arranged in series and parallel by which improved separation is secured utilizing pressure cycling without the transfer of external heat.

In various industrial processes, moisture-free or oxygen- or nitrogen-rich air streams are essential to proper operating procedures. Many methods and a variation of apparatus combination are known or have been proposed to obtain such ends. Most involve either complicated procedures or eqiupment expensive to assemble and operate. It is an object of the present invention to provide a simple method which, with minor modification, may be employed in a multitude of situations where the purification or concentration of gaseous mixtures is desired. Specifically, the objects of the present invention may be stated as follows:

(1) To provide a method whereby oxygen and/or nitrogen-rich products may be recovered from atmospheric air without liquefaction or other expensive or complicated procedures.

(2) To provide a method whereby a gaseous mixture may be fractionated to provide a series of effluent product streams in which each such effluent stream is rich in at least one component portion of the gas mixture supplied to the system as a feed material.

The terms "gas" and "gaseous" as employed in the following description or claims are intended to include not only materials that are conventionally considered to be gases, but also those materials conventionally considered to be vapors. Also, the term "key component" as employed in the following description or claims is used to designate the component or components selectively adsorbed from a stream of a gaseous material initially fed to the system.

The present invention may be more fully understood by reference to the FIGURE illustrating the same. The figure will be described utilizing two zones in series and a three-component feed mixture. It is, however, to be understood that additional zones may be utilized in series, up to as many as four or six more, and that the feed mixture may comprise a plurality of gaseous constituents.

Referring specifically to the figure, a feed mixture comprising components A, B, and C is introduced into zone 10 by means of feed line 1. Zones 10 and 20 are on the adsorption cycle and maintained at a relatively high pressure. Zones 30 and 40 are on the desorption cycle and are maintained at a relatively low pressure. Zones 10 and 40 are packed with adsorbent Y which is selective for constituent C. Zones 20 and 30 contain an Adsorbent X which is selective for constituent B. The zones are pressure cycled in a manner as described in the hereinbefore identified patent. Thus, as the feed mixture flows upwardly through zone 10, constituent C is adsorbed and an increasing concentration gradient of C moves upwardly through bed Y. A gaseous mixture comprising constituents A and B is removed overhead from the top of zone 10 by means of line 2 and introduced into the bottom of zone 20. Flow through line 3 is prevented by means of valve 4. Thus, as an increasing concentration gradient of C moves upwardly on adsorbent Y in zone 10, simultaneously an increasing concentration gradient of B advances upwardly on adsorbent X in zone 20. A gaseous mixture comprising A is withdrawn overhead from zone 20 by means of line 5 and passed into line 6. This stream is segregated into three streams, one of which is withdrawn from the system as a product by means of line 7. A second stream is introduced into the top of zone 30 by means of line 8 in order to backwash downwardly through zone 8. Simultaneously a third stream is segregated by means of line 9 and passed downwardly through zone 40 by means of line 11. Flow upwardly through line 11 into the bottom of zone 30 is prevented by means of valve 12.

Thus, when zones 10 and 20 go on adsorption in a manner as hereinbefore described, zones 30 and 40 go on desorption simultaneously. A decreasing concentration gradient of B moves downwardly in zone 30, and a decreasing concentration gradient of C simultaneously moves downwardly in zone 40. A gaseous mixture comprising A and B is withdrawn from the bottom of zone 30 by means of line 13 and passed into separation zone 14 which preferably comprises a compressor but may also comprise cooling means. It is evident that the concentration of B in the stream withdrawn by means of line 13 is higher than the concentration of B in the stream introduced into zone 20 by means of line 2. In a practical operation, the concentration of B in line 13 as compared to the concentration of B in line 2 is appreciably greater. In zone 14, A and B are segregated, B being removed by means of line 15 and A by means of line 16. Flow through line 17 is prevented by means of valve 18. Simultaneously, a decreasing concentration gradient of C moves downwardly in zone 40. A gaseous mixture comprising A and C is withdrawn from the bottom of zone 40 by means of line 19 and introduced into separation zone 21 which preferably comprises a compression zone. It is evident that the concentration of C in the gaseous mixture withdrawn by means of line 19 is appreciably greater than the concentration of C in the mixture introduced into zone by means of line 1. Flow through line 22 is prevented by means of valve 23. Separation zone 21 may comprise any type of separation means, such as cooling means and the like. A gaseous mixture comprising C is withdrawn from zone 21 by means of line 24 and handled as desired, whereas a stream comprising A is withdrawn from zone 21 by means of line 25. Flow through line 26 is prevented by means of valve 27.

Thus, summing up, increasing concentration gradients of respective adsorbed constituent advances upwardly in zones 10 and 20 while simultaneously decreasing concentration gradients of the respective constituents advance downwardly in zones 30 and 40. The cycle is continued for a time period less than that required to have complete saturation of Y with C and of X with B and for a time period less than that required to completely remove B from X at the bottom of the zone and C from Y at the bottom of the zone. At this point zones 30 and 40 go on adsorption and zones 20 and 10 go on the desorption cycle. Flow through line 1 is discontinued by means of valve 28, and flow into the bottom of zone 20 is prevented by valve 29. Flow from the bottom of zone 40 is prevented by valve 31, and flow through line 9 is prevented by means of valve 32. Valve 12 opens so as to permit flow upwardly through line 11 into the bottom of zone 30, and valve 27 opens in a manner to permit the introduction of a gaseous mixture comprising A, B, and C into the bottom of zone 40 by means of line 26. When zone 40 goes on the adsorption cycle an increasing concentration gradient of C advances upwardly on adsorbent Y, and an increasing concentration gradient of B in zone 30 moves upwardly on adsorbent X. A gas comprising A is removed overhead from zone 30 by means of line 8 and divided into three streams.

One stream is removed as a product by means of line 7. A second stream is introduced into the top of zone 20 by means of line 5, and a third stream introduced into the top of zone 10 by means of lines 3 and 2. Thus, a decreasing concentration gradient of B on X moves downwardly in zone 20, and a decreasing concentration gradient of C on Y moves downwardly in zone 10. A gaseous mixture comprising A and B is removed from the bottom of zone 20 by means of line 17 through valve 18 and introduced into separation zone 14 and handled as hereinbefore described with respect to the gaseous mixture introduced into separation zone 14 by means of line 13. During this portion of the cycle flow through line 13 is prevented by means of valve 33. Here again, the concentration of B in the stream removed by means of line 17 is appreciably greater than the concentration of B introduced into the bottom of zone 30 by means of line 11.

A gaseous stream comprising AC is withdrawn from the bottom of zone 10 by means of line 22 through valve 23 and introduced in separation zone 21, and handled in a manner as hereinbefore described with respect to the stream withdrawn from the bottom of zone 40 by means of line 19. During this portion of the cycle, flow through line 19 is prevented by means of valve 31. The concentration of C in the stream withdrawn by means of line 22 is appreciably greater than the concentration of C in the gaseous mixture introduced into the bottom of zone 40 by means of line 26. Prior to the time that Y in zone 40 is completely saturated with C, and X in zone 30 completely saturated with B, and X in zone 20 completely free of B at the bottom thereof, and Y in zone 10 completely free of C at the bottom thereof, zones 10 and 20 will go on adsorption and zones 30 and 40 will go on desorption. The operation is then cyclically continued as hereinbefore described. The time of the cycle may vary appreciably depending upon the particular separation process being conducted. For example, the cycle may be continued for a period of 30 seconds to 2 minutes or as high as 10 to 30 minutes. The time is determined so as to secure the conservation of heat and thus eliminate the transfer of heat either into or out of the beds.

One great advantage of the present process is the conservation of heat evolved on the adsorption cycle. Processes as heretofore known in the art conducted the adsorption cycle for a period sufficient to raise the delta T appreciably, thereby permitting or causing heat to flow through the bed, as well as through the walls of the adsorption vessel, thus to be substantially lost. In accordance with the present invention, wherein rapid cycling is employed between the adsorption and the desorption phases, the delta T on the adsorption zone is relatively small. This tends to greatly reduce the flow of heat. Due to the short time on the adsorption cycle, heat will not have time to flow through the bed, and through the walls of the vessel into the surrounding atmosphere. By rapid cycling from adsorption to desorption in the respective zones, the desorption cycle will substantially completely utilize the heat produced during the adsorption cycle. As pointed out above, this is due to the low delta T attained, and due to the lack of time for dissipation of the heat of adsorption. In effect, the beds function as highly efficient, rapidly cycled, bead heat exchangers. Generally, the time on the adsorption cycle in accordance with the present invention does not exceed 2–3 minutes and is preferably less than 1 minute. A very desirable time on the adsorption cycle is less than 20 seconds as, for example, 10 seconds.

The particular times utilized depend upon various factors, such as the particular adsorbent utilized, the height of the bed, the nature of the key component, and other operating variables.

The particular adsorbent used may also vary appreciably depending upon the type of feed mixture being fractionated. This material may be any adsorbent material which has a selective affinity for one or more of the components of the gas mixture supplied to the system by way of the conduit 11. As shown, the adsorbent material is uniform and continuous throughout each vessel. If desired, however, the vessels may be packed with a number of different adsorbent materials arranged in layers In such instance, it is preferred that the layers be physically separated. For example, separator plates may be introduced to extend diametrically across the vessel, or each adsorbent may be prepacked in a suitable carrier container and the several containers inserted to form a series from one end of a vessel to the other.

Depending upon the operation contemplated, the adsorbent employed may be selected from such materials as activated carbon, alumina, silica gel, glass wool, adsorbent cotton, and even soft tissue paper. Various metal oxides, clays, fuller's earth, bone char, etc. also have adsorbent characteristics which may be utilized according to the present invention. Still another adsorbent material of the character contemplated is one known as Mobil-beads, which is a siliceous moisture adsorbing compound.

Other adsorbent materials suitable for employment according to the present invention include materials known as molecular sieves. This class of materials includes certain zeolites, both naturally-occurring and synthetic, which have crystalline structures containing a large number of small cavities interconnected by a number of still smaller holes or pores, the latter being of exceptional uniform size. The pores may vary in diameter from 3 to 5 Angstrom units, to 12 to 15 or more. For a particular molecular sieve material, however, the pore sizes are substantially uniform and accordingly the material normally will be designated by the characteristic size of its pores.

The pressure differential between the high and low pressure may also vary appreciably depending upon the type of feed mixture being fractionated and the types of adsorbents being utilized. Generally, it is preferred that the low pressure be at atmospheric pressure or under vacuum. However, the low pressure may comprise a pressure above atmospheric and even be as high as several hundred pounds or higher. Generally, it is preferred that the relatively high pressure be at least twice as great as the relatively low pressure.

The operating process principles of the present invention may be illustrated by the following. Let $X =$ mol fraction of $H_2$ in feed $$\frac{(\text{mol. percent})}{(100)}$$

$(1-X) =$ mol fraction of $CH_4 +$ other components
$F =$ s.c.f./cycle of mixed feed. Referred to $P_0$, a standard absolute pressure, and $T_0$, the ambient temperature of apparatus.
$R =$ s.c.f./cycle of purge flow having the composition of the product (pure $H_2$). Referred to $P_0$, a standard absolute pressure, and $T_0$, the ambient temperature of apparatus.
$P_{High} =$ adsorption pressure absolute.
$P_{Low} =$ desorption pressure absolute.

The heatless fractionation principle for complete purification of a product is that:

| Purge, vol./cycle at low pressure | Equal or is greater than | Feed vol./cycle at high pressure |
|---|---|---|
| $\dfrac{R}{P_{Low}/P_0}$ | $\geq$ | $\dfrac{FX+(1-X)}{P_{High}/P_0}$ | or
$$R \geq FP_{Low}/P_{High} \qquad (1)$$

This defines the minimum purge of pure product needed to sweep back the concentration gradient of adsorbed components the same distance the gradient was swept forward (toward the product end of the bed) during the adsorption cycle. The cycle must be short enough so that the heat of adsorption liberated by the compounds caught on the bed does not get lost. It must be retained in the bed to provide the heat to desorb them during the purge cycle. The beds must be long enough to make channeling negligible.

When small impurities are being removed completely from a stream, as in the case of water and oil vapor from compressed air, X (air) is very near unity, and $(1-X)$ for the impurities is small. There is very little gas volume removed from the feed as it passes through the bed. The product D (s.c.f./cycle) for external use plus the purge, R, is almost equal to the feed, F. Equation 1 becomes $$\frac{R}{P_{Low}/P_0} \geq \frac{F}{P_{High}/P_0} \geq \frac{R+D}{P_{High}/P_0}$$

or $$R \geq \frac{R+D}{P_{High}/P_{Low}} \qquad (2)$$

This Equation 2 is the one used with the heatless dryer. Equation 1 is more general, and it is used where a considerable part of the feed volume disappears into the bed as it flows through it under high pressure.

The demonstration of pure $H_2$ recovery from $H_2+CH_4+$heavy ends mixtures and the verification of Equation 1 are major discoveries of this invention.

The maximum possible recovery for external use of the least adsorbed component ($H_2$) is determined by its concentration in the feed and the pressure ratio used for adsorption/desorption.

Max. pure $H_2$ recovery $=\dfrac{\text{Pure } H_2 \text{ removed as useful product/cycle}}{H_2 \text{ in feed/cycle}}$ Max. recovery $H_2 = \dfrac{FX - R}{FX}$ From (1)

$$R \geq F P_{Low}/P_{High}$$

Max. recovery $H_2 = \dfrac{FX - FP_{Low}/P_{High}}{FX}$ $$= 1 - P_{Low}/P_{High} \cdot X \qquad (3)$$

As Example Number 3:

Feed=50-50 mol. percent $H_2$—CH $P_{High}$=155 p.s.i.g.=170 p.s.i.a.

$P_{Low}$=0 p.s.i.g.=14.7 p.s.i.a.

Max. recovery pure $H_2 = 1 - 14.7/170 \times 0.50$ $= 1 - .174 = 0.826$ $= 82.6\%$ Best observed $H_2$ recovery=70%

Example Number 4: The recovery of pure product is zero when the pressure ratio $P_{High}/P_{Low}$ is equal to the inverse of the mol, ratio of product component in the feed, $1/X = P_{High}/P_{Low}$.

Recovery of pure product $= 1 - \dfrac{1/X}{P_{High}/P_{Low}} = 0$

This defines the minimum pressure ratio to achieve high purity product separation.

The process of the present invention may be more fully understood by reference to the following example illustrating the same. Zones 30 and 20 were packed with carbon adsorbent. Other satisfactory adsorbents could comprise among others activated aluminum and 13X sieves. Zones 10 and 40 were packed with an ion exchange resin, namely Dowex. Other satisfactory adsorbents among others could comprise lithium chloride, cellulose, and calcium sulfate. In general, these adsorbents are synthetic ion exchange resins, such as Dowex 50 or 50W (X4, X10) or Amberlite 120. Dowex is manufactured by the Dow Chemical Company of Midland, Michigan, and Amberlite 120 is manufactured by Rohm & Haas, Inc., Philadelphia, Pennsylvania. In general, these polymers may comprise a polystyrene which has been cross-linked with divinyl benzene and further treated, such as sulfonated. Typical ion exchange resins are those described on pages 60 and 61 of the "Chemical and Engineering News" of November 30, 1959. Other typical ion exchange adsorbents which may be used in accordance with the present invention are those described on pages 76, 77, 78, 79, and 80 of "Chromatography," A Review of Principles and Applications by Edgar Lederer, Professor of Biochemistry, Sorbonne, Directeur de Recherches, Institut de Biologie Physico-Chimique, Paris; and Michael Lederer, Maitre de Recherches, Institut du Radium, Paris, Second, Completely Revised and Enlarged Edition, Elsevier Publishing Company, Amsterdam, London, New York, Princeton, 1957. Other properties of the ion exchange resins are summarized in a publication by the Dow Chemical Company, entitled "Dowex::ION Exchange," The Dow Chemical Company, Midland, Michigan, published in 1958 and 1959. Appendix B appearing on pages 71 through 75 lists the resin properties.

The relatively high pressure of zones 10 and 20 was about 50 pounds gauge. While the relatively low pressure on the desorption cycle was about atmospheric.

The feed mixture introduced comprises methyl alcohol, water vapor, and nitrogen. When zones 10 and 20 are on adsorption, the water vapor is removed in zone 10 and the alcohol in zone 20. Thus, the mixture segregated in zone 14 comprises nitrogen and alcohol, and the mixture segregated in zone 21 comprises water vapor and nitrogen. Other mixtures wherein alcohol and water could be segregated comprise propyl alcohol from water vapor and methyl chloride from water vapor. In each instance, the water vapor was adsorbed on the Dowex and the alcohol on the activated carbon.

It is within the scope of the present invention to employ a carrier gas, as for example nitrogen, in particular operations. Thus, the nitrogen could be bubbled through a liquid mixture of alcohol and water, such as methyl alcohol and water, and the vaporous mixture comprising nitrogen, alcohol, and water, and handled as hereinbefore described to prepare a water-free alcohol. Under these conditions it would be desirable to recycle the nitrogen.

Thus, the present invention employs a pressure cycling technique as taught in the above-identified patent and extends the same to include a plurality of pressure cycling zones arranged in series in two parallel lines as described.

While the invention has been described covering repressuring from the feed end, it is within the scope of the present invention to repressure from the product end with product gases. As a matter of fact, under certain circumstances, this is very effective and desirable. It is also within the scope of the present invention to repressure one vessel from the feed end and to repressure the other vessel from the product end.

Also, while the invention has been described with respect to segregating the binary mixtures in zones 14 and 21, this binary mixture in many instances can be passed directly as a feed to another operation. The respective zones could be of different sizes and be sized to the composition of the particular feed undergoing separation. It is within the scope of the present invention to backwash zone 4 with the product from zone 1 in certain instances and to backwash zone 3 with product from zone 2, as well as to repressure these zones in this manner. One particular desirable type of operation is to use the sodium form of Dowex 50WX8 in the initial bed, which will become water only, and to use the hydrogen of Dowex 50WX8 in the second vessel for the removal of alcohols.

What is claimed is:

1. A method of fractionating a gaseous mixture of at least two components consisting essentially of the steps of flowing a feed stream of said gaseous mixture at a preselected initial relatively high pressure and in an initial positive flow direction through a first fixed bed of a first adsorbent, selective for at least one component of said mixture, for a first cycle time period less than that required for said bed to come to equilibrium with said first component, discharging the unadsorbed portion of said feed stream as a first primary effluent stream, flowing said first primary effluent at said preselected initial relatively high pressure and in initial positive flow direction through a second fixed bed of a second adsorbent, selective for at least a second component of said mixture, for a first cycle time period less than that required for said second bed to come to equilibrium with said second component, discharging the unadsorbed portion of said feed stream as a second primary effluent, interrupting flow of said feed stream at the end of said first cycle, and reducing said initial pressure on said first bed at the inlet end, desorbing said first component from said first bed at a reduced pressure and discharging said desorbed first component from said first bed in a flow direction opposite to that of said feed stream of gaseous material for a second cycle time period, during said second time period flowing at least a portion of said second primary effluent through said first bed in a flow direction of said desorbed first component and discharging said portion of second primary effluent from said first bed together with said desorbed component as a secondary effluent stream, desorbing said second component from said second bed at a reduced pressure, and discharging said desorbed second component from said second bed in a flow direction opposite to that of said feed stream of gaseous material, for a second cycle time period during said second time period, flowing at least another portion of said second primary effluent stream through said second bed in the flow direction of said desorbed second component, and discharging said portion of said second primary effluent portion from said second bed together with said desorbed component as a second secondary effluent stream, said time periods being each of such short duration that the heats of adsorption and desorption are substantially balanced within said beds, and that substantially the sole transfer of heat to and from the gas occurs in said beds, thereby eliminating the need for the transfer of heat externally with respect to said beds, adjusting said cycle periods for a duration adapted to develop an oscillating concentration gradient of said components in said beds which remains in the beds during both the adsorption and desorption cycle and imparting oscillatory movement to said front substantially within the limits of said beds.

2. Process as defined by claim 1 wherein said first component comprises water, wherein said second component comprises an alcohol, wherein said first adsorbent comprises an ion exchange resin, and wherein said second adsorbent comprises activated carbon.

3. A process for the removal of the key components from a gaseous mixture stream utilizing at least four adsorbent beds, half of which are arranged in parallel, and each bed of which is characterized by having a one end and another end, said process comprising the steps of flowing a feed stream of a gaseous material, including key components from one end to the other end through a first bed of an adsorbent initially relatively free of a first key component at a preselected initial relatively high pressure and in a positive flow direction in an initial cycle, said adsorbent being preferentially selective for said first key component, discharging said gaseous mixture stream from said first bed as a first primary effluent, flowing said first primary effluent as a gaseous mixture including a second key component from one end to the other end through a second bed arranged in series with said first bed, having a second adsorbent initially relatively free of said second key component at said preselected initial relatively high pressure, and in a positive flow direction in an initial cycle, said second adsorbent being preferentially selective for said second key component, discharging said gaseous mixture stream from said second bed as a second primary effluent, segregating a portion of said second primary effluent as a product stream and withdrawing the same, passing the remainder of said second primary effluent in reverse flow from the one end to the other end of a third bed arranged in parallel with respect to said first and second bed, said third bed having an adsorbent at a relatively low pressure which adsorbent is relatively saturated with said second key component as compared to said second bed at the start of said initial cycle, flowing another portion of said second primary effluent in reverse flow from the other end to the one end through a fourth bed of adsorbent maintained at said relatively low pressure which adsorbent is relatively saturated with said first key component as compared to said first bed at the start of said initial cycle, whereby as said initial cycle continues said first and said second bed become relatively saturated with said first key component and said second key component respectively progressively from said one ends toward said other ends, and whereby said third bed and said fourth bed become relatively free from said second key component and said first key components respectively from said other ends toward said one ends, continuing said initial cycle for a time period less than that required to secure saturation of said first bed and said second bed at said other ends and that required to secure freedom from said key components of said third bed and said fourth bed at said one ends, thereafter introducing said feed stream into said one end of said fourth bed in positive flow direction at said initial relatively high pressure, discharging said gaseous mixture stream from said other end of said fourth bed as a first primary effluent, introducing said first primary effluent into said one end of said third bed, and discharging from said third bed a second primary effluent stream from said other end, segregating a portion of said last named second primary effluent as a product stream and withdrawing the same, passing the remainder of said last named primary effluent in reverse flow from said other ends to said one ends of said first and second beds of adsorbent at said relatively low pressure, and thereafter cyclically continuing the operation.

4. Process as defined by claim 3 wherein said first component comprises water, wherein said second component comprises an alcohol, wherein said first adsorbent comprises ion exchange resin, and wherein said second adsorbent comprises activated carbon.

References Cited in the file of this patent

UNITED STATES PATENTS

| | | |
|---|---|---|
| 2,693,865 | Scheeline | Nov. 9, 1954 |
| 2,944,627 | Skarstrom | July 12, 1960 |
| 2,992,703 | Vasan et al. | July 18, 1961 |